United States Patent
Lyda et al.

(10) Patent No.: US 10,049,359 B2
(45) Date of Patent: Aug. 14, 2018

(54) IDENTITY RISK SCORING

(71) Applicant: CheckFree Corporation, Norcross, GA (US)

(72) Inventors: Paul J. Lyda, Powell, OH (US); Brett V. Borger, Lewis Center, OH (US); James Patrick McCabe, Marysville, OH (US); Roy Alan Southard, West Liberty, OH (US); Hans D. Dreyer, Pataskala, OH (US)

(73) Assignee: CheckFree Corporation, Norcross, GA (US)

( * ) Notice: Subject to any disclaimer, the term of this patent is extended or adjusted under 35 U.S.C. 154(b) by 612 days.

(21) Appl. No.: 14/617,622

(22) Filed: Feb. 9, 2015

(65) Prior Publication Data

US 2015/0154599 A1    Jun. 4, 2015

Related U.S. Application Data

(63) Continuation of application No. 11/769,282, filed on Jun. 27, 2007.

(51) Int. Cl.
*G06Q 20/40* (2012.01)
*G06Q 40/00* (2012.01)

(52) U.S. Cl.
CPC ..... *G06Q 20/4014* (2013.01); *G06Q 20/4016* (2013.01); *G06Q 40/00* (2013.01)

(58) Field of Classification Search
None
See application file for complete search history.

(56) References Cited

U.S. PATENT DOCUMENTS

| | | | |
|---|---|---|---|
| 6,513,018 B1 | 1/2003 | Culhane | |
| 6,810,480 B1 * | 10/2004 | Parker | G06F 21/32 |
| | | | 713/168 |
| 7,458,508 B1 | 12/2008 | Shao et al. | |

(Continued)

FOREIGN PATENT DOCUMENTS

| | | | | |
|---|---|---|---|---|
| WO | WO-0237219 A2 * | 5/2002 | ......... | G06Q 20/4016 |
| WO | WO-2006118968 A2 * | 11/2006 | ........... | G06Q 20/341 |

OTHER PUBLICATIONS

Comaford, C. Corporate Developer: A Guide to Controls and Window Types. PC Magazine, vol. 13, No. 10 (May 31, 1994), p. 304 (Year: 1994).*

(Continued)

*Primary Examiner* — Kito R Robinson
*Assistant Examiner* — Bolko M Hamerski
(74) *Attorney, Agent, or Firm* — Alston & Bird LLP

(57) ABSTRACT

An identity risk score may be determined for subscribers of a service to indicate a level of confidence or certainty associated with a subscriber's identity. The identity risk score may be modified upward or downward in order to reflect changing levels of certainty. The changes may be based on transactions performed on behalf of and/or information submitted by the subscriber. Functionality provided to the subscriber may also be dependent upon whether the subscriber's identity risk score meets a threshold. In one or more arrangements, an identity risk score may be determined based on whether information entered by the subscriber can be confirmed and a level of confidence with which the information is confirmed.

20 Claims, 12 Drawing Sheets

(56) References Cited

U.S. PATENT DOCUMENTS

| | | | |
|---|---|---|---|
| 7,908,645 B2* | 3/2011 | Varghese | G06Q 20/341 |
| | | | 715/773 |
| 2002/0087469 A1 | 7/2002 | Ganesan et al. | |
| 2002/0087471 A1 | 7/2002 | Ganesan et al. | |
| 2003/0199869 A1 | 10/2003 | Johnson et al. | |
| 2004/0019568 A1 | 1/2004 | Moenickheim et al. | |
| 2004/0083394 A1* | 4/2004 | Brebner | G06F 21/31 |
| | | | 726/19 |
| 2004/0088255 A1 | 5/2004 | Zielke et al. | |
| 2004/0199769 A1* | 10/2004 | Proudler | G06F 21/46 |
| | | | 713/169 |
| 2005/0097320 A1 | 5/2005 | Golan et al. | |
| 2005/0283429 A1 | 12/2005 | Bates et al. | |
| 2006/0161435 A1* | 7/2006 | Atef | G06F 21/31 |
| | | | 704/246 |
| 2006/0212386 A1 | 9/2006 | Willey et al. | |
| 2007/0136573 A1 | 6/2007 | Steinberg | |
| 2007/0226138 A1 | 9/2007 | Koltnow et al. | |
| 2008/0086759 A1* | 4/2008 | Colson | G06F 21/34 |
| | | | 726/2 |
| 2008/0103798 A1* | 5/2008 | Domenikos | G06Q 30/0185 |
| | | | 705/318 |
| 2012/0265675 A1* | 10/2012 | Lawrence | G06Q 20/10 |
| | | | 705/39 |

OTHER PUBLICATIONS

Ganger, G.R. Authentication Confidences. Technical Report CMU-CS-01-123. Carnegie Mellon University School of Computer Science, Apr. 2001 (Year: 2001).*

* cited by examiner

IDENTITY RISK SCORING

BACKGROUND

The protection and security of an individual or entity's identity is critical in virtually every facet of society. Similarly, the security and validity of an individual or entity's identity is equally important for the protection of an organization in taking the risk of interacting with the individual or entity. From banking to joining social organizations to making financial transactions, an organization or company must generally have a degree of certainty about an entity's identity to reduce risks associated with engaging in such activities with the entity. Thus, companies or other entities may generally perform some form of identity verification prior to engaging in a transaction with another entity.

BRIEF DESCRIPTION OF THE DRAWINGS

Aspects of the present invention are illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Operating Environment

Figure 1:
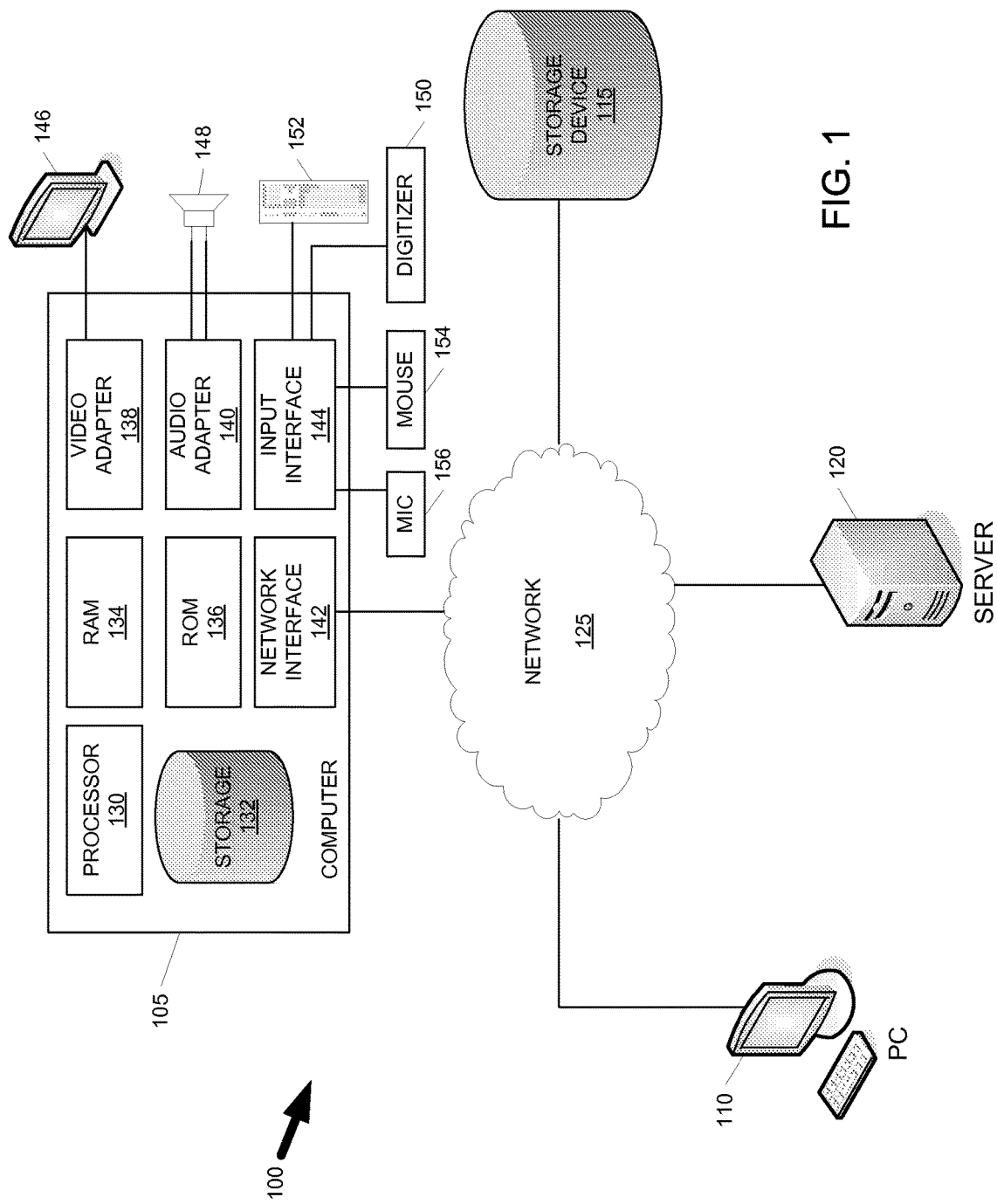
FIG. 1 is a block diagram of an identity risk management system in which one or more aspects described herein may be implemented.

FIG. 1 illustrates a networked system, i.e., system 100 that may be used to determine, manage, and process identity risk scores. Identity risk scores may include a numeric value, symbol, word, phrase or combinations thereof representative of a degree of certainty with which an identity has been or is being verified. System 100 may include multiple devices 105, 110, 115 and 120 connected through network 125. Examples of devices 105, 110, 115 and 120 include, respectively, computer 105, personal computer (PC) 110, storage device 115, and server 120. In one example, data used in computer 105 may be stored, at least in part, on a remote storage device such as storage device 115. Similarly, some processing tasks may be delegated by computer 105 to one or more of the other devices, such as server 120. Accordingly, devices 105, 110, 115 and 120 may operate as both a collective processing entity and as individual system components.

Devices 105, 110, 115 and 120 may connect to network 125 through a variety of connection configurations and protocols. For example, device 105 may be connected to network 125 through a local area network (LAN), a wireless local area network (WLAN) and/or a wide area network (WAN). In another example, device 115 may connect to network 125 through a wireless cellular connection. Network 125 may further support various types of communication protocols including Internet Protocol (IP), simple mail transfer protocol (SMTP), Internet Message Access Protocol (IMAP) and the like. One of ordinary skill in the art will appreciate that a multitude of network and communication protocol types exist and may be used in conjunction with or in place of the examples described herein. Additionally, in one or more arrangements, the communication protocols may include encryption and/or other security measures to protect against interception of information by unauthorized third parties. For example, data may be encrypted using Pretty Good Privacy (PGP) encryption techniques.

Devices 105, 110, 115 and 120 may include a variety of components. For example, in one or more configurations, device 105 may include zero, one, or multiple of each of processor 130, local database 132, random access memory 134, read only memory 136, video adapter 138, audio adapter 140, network interface 142 and input interface 144. Processor 130 may be configured to perform a variety of tasks and processes based on instructions stored in local database 132, random access memory 134 and/or read only memory 136. Local database 132 may include a magnetic disk drive, an optical disk drive and/or a flash memory drive. In one example, processor 130 may generate a user interface based on a particular application's instructions. The user interface may be displayed through video adapter 138 for display on screen 146. Additionally, audio such as music or audio cues may be output through audio adapter 140 and speakers 148. Input interface 144 may be used to facilitate connection and communication with input devices such as digitizer 150, keyboard 152, mouse 154 and/or microphone 156. Other and/or additional components may be integrated into a system or device such as PC 105.

Figure 2:
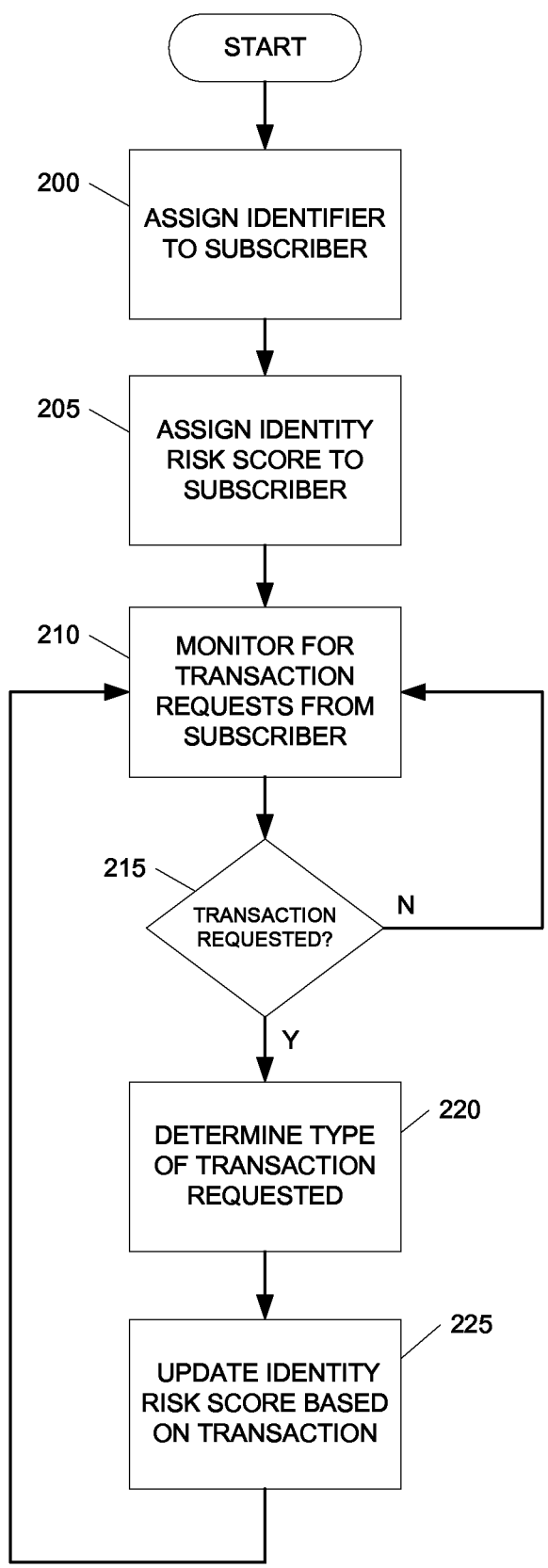
FIG. 2 is a flowchart illustrating a method for assigning and managing identity risk scores for one or more subscribers according to one or more aspects described herein.

FIG. 2 is a flowchart illustrating a method for generating and managing identity risk scores for one or more subscribers of a financial commerce service. A subscriber, as used herein, generally relates to an entity (e.g., an individual or business) having a particular service relationship with another entity (e.g., a service provider). As such, an individual may count as two subscribers in a service provider's database if the individual has two subscriber relationships or subscriptions with the service provider. For example, an individual may have two payor subscriptions with the service provider if each of the payor subscriptions has a different sponsor (e.g., a bank from which the funds originate). Sponsor, as used herein, generally relates to an entity that provides an entry point or "front end" for the consumer. For example, a sponsor may provide financial backing or funding for an entity. Sponsors may include banks, brokerages, businesses and the like. Accordingly, multiple subscribers may correspond to a single entity. In step 200, the financial service may initially assign an identifier to each of the subscribers in a database. Each identifier may include a numeric code, a string of alphanumeric characters, a symbol and the like. In one or more arrangements, the identifier may be, or may be based upon, a value retrieved from a third party identity service that provides identity services to multiple businesses or other entities. Each of the multiple businesses or entities may then communicate with one another about a particular entity or individual using the same identifiers provided by the identity service. In step 205, each of the subscribers may be assigned an initial identity risk score. The initial identity risk score may be predefined and/or set based on an internally generated confidence level or that returned by a third party identity service. Additional details regarding the initialization and updating of subscriber identifiers and identity risk scores is provided below.

Once the subscribers in the database have been assigned an identifier and an initial identity risk score, the service provider system may monitor for various transaction requests that may affect one or more subscribers' identity risk score in step 210 and 215. If a transaction request is detected in step 215, the service may determine the type of transaction that is being requested in step 220. Types of transactions may include, but are not limited to, the enrollment of a new subscriber, addition of financial account information (e.g., adding a checking account's routing transit number and account number for issuing payments on behalf of a subscriber), addition of payee information (e.g., adding information associated with an entity to which funds are to be transferred) and/or the update of identifier information. Generally, a transaction request involves the addition of information that was not previously associated with a subscription or subscriber entry to which the transaction request pertains. Other types of transaction requests may also be facilitated by the service.

Based on the type of transaction requested, a subscriber's identity score may be updated accordingly in step 225. For example, a subscriber's identity risk score may be increased if an association between a new financial account and a subscriber may be confirmed. The association may be confirmed by the service provider or by the third party identity service. For purposes of describing the various methods and systems discussed herein, increasing an identity risk score is used to reflect more confidence in a subscriber's identity while reducing an identity risk score corresponds to a decrease confidence. However, one of skill in the art will appreciate that a variety of other interpretations of identity risk scores may be used including associating an increase in identity risk score with less confidence and a decrease in the score with increased confidence. Alternatively, increasing an identity risk score may correspond to less confidence while reducing the score may correspond to more confidence. In another example, the conversion of a subscriber's identifier from a first type of identifier to a second type of identifier may also increase or decrease the identity risk score associated with the subscriber. The various transactions described and their effects on a subscriber's identity risk score are discussed in further detail below. Once a subscriber's identity score has been modified, the service provider may loop back to steps 210 and 215 where further transaction requests may be detected and processed.

Figure 3:
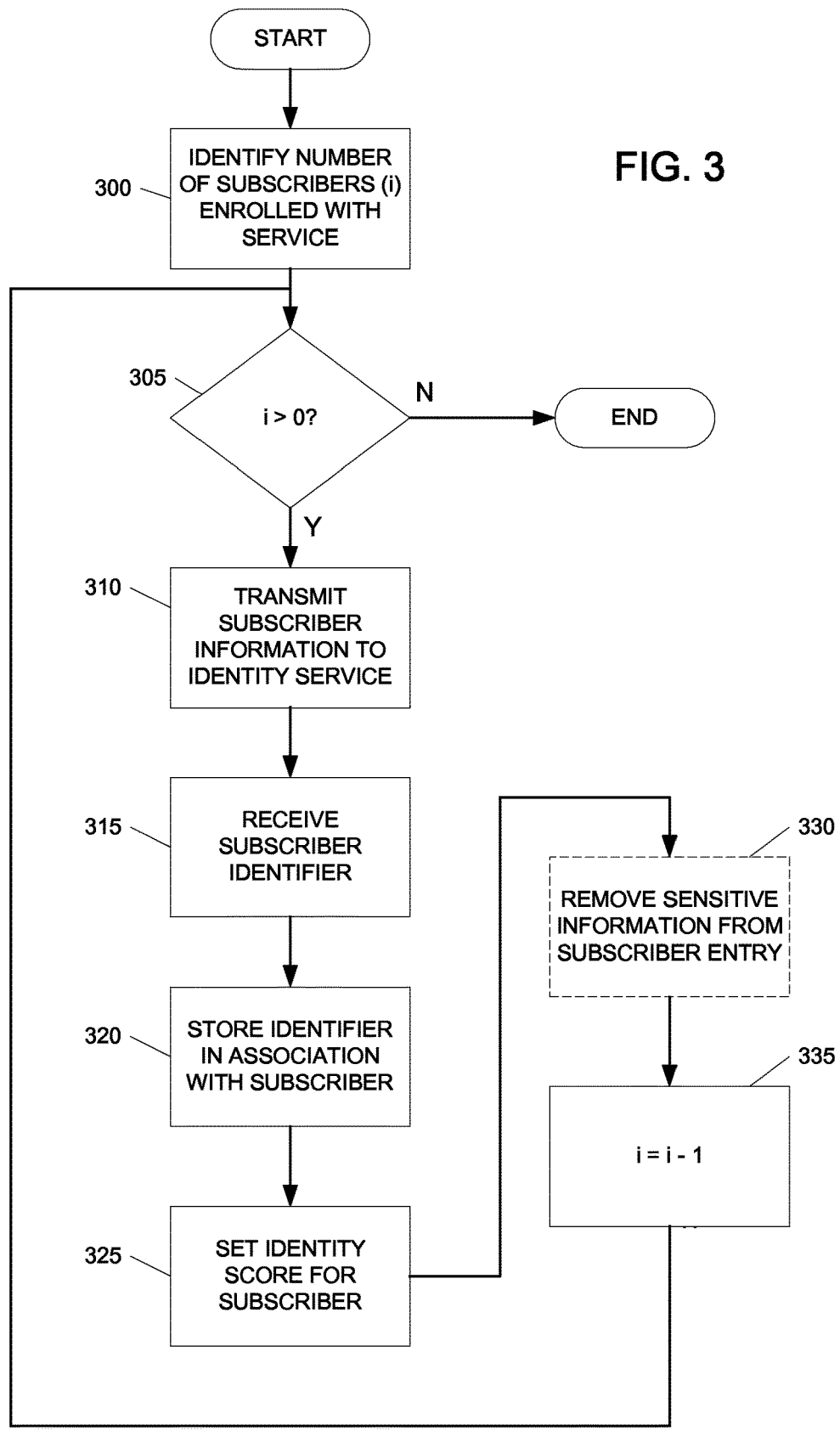
FIG. 3 is a flowchart illustrating a method for initializing identifiers and identity risk scores for a database of subscriber and subscriber entries according to one or more aspects described herein.

FIG. 3 is a flowchart illustrating a method for updating or initializing a database having subscriber information. In step 300, a service provider may determine the number of subscribers, e.g., represented by the counter variable i, currently enrolled in the service provider's database in order to iterate through all subscribers. Initially, the number of subscribers, i, may correspond to the number of subscribers that need to be processed. In step 305, the service provider may determine whether the number of subscribers that need to be processed is greater than 0. In other words, the service provider may determine whether any subscribers need to be processed. If the number of subscribers that require processing is greater than 0, the service provider may transmit subscriber information such as name, address, social security number and other information associated with a first subscriber to a third party identity service in step 310. The third party identity service may be used to determine an identifier associated with the first subscriber. Identifiers may be assigned by a third party identity service to an entity for purposes of identification without having to disclose personal information about the entity. In step 315, an identifier may be received from the third party identity service. Identifiers may be universal or temporary. Universal identifiers relate to identifier-entity correspondences that have already been established. That is, the third party identity service is able to match the submitted subscriber information to information stored in its database. In contrast, if the third party identity service is unable to match the subscriber information, the identity service may issue a temporary identifier instead.

Upon receipt, the service provider may store the received identifier in association with the subscriber in step 320. That is, the identifier is stored such that subscriber information may be located and/or identified using the identifier and vice versa. In step 325, an initial identity score may be set for the subscriber. The identity score may be an initial default score or may be determined based on a set of predefined factors. For example, the identity score may correspond to a confidence level returned by the third party identity service and/or an amount of experience the service provider has had with the subscriber.

In step 330, the financial service may optionally remove sensitive information associated with the subscriber or subscriber entry thereof from the database. Such a process may reduce security exposure should a hacker ever obtain access to the database. In step 335, the service provider may decrement the number of subscribers by 1 to update the number of subscribers that still need to be processed. The process may then return to step 305, where the service provider may determine if other subscribers need to be processed (i.e., if i>0). If so, a second subscriber may be processed as described above. If not, the process may end.

Figure 4:
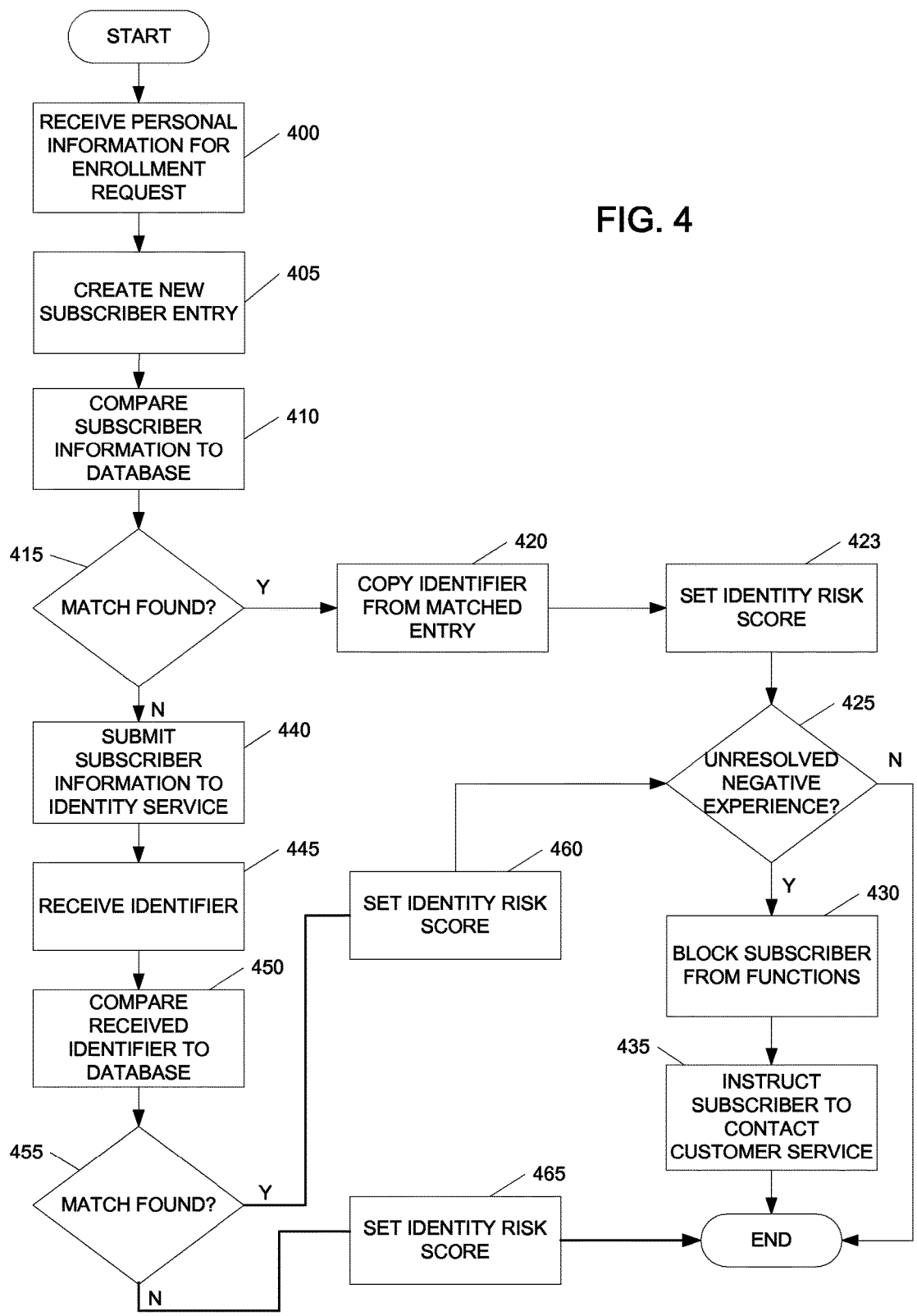
FIG. 4 is a flowchart illustrating a method for initializing an identity risk score based on an enrollment request according to one or more aspects described herein.

In instances where a new subscriber has enrolled or is enrolling, a service provider may determine an initial identity risk score based on various information. A service provider, as used herein, facilitates processing of electronic financial transactions such as bill payment, money transfers, on-line purchases and the like. FIG. 4 is a flowchart illustrating a method for generating an identity risk score for a newly enrolling subscriber. In step 400, the service provider may receive information including personal data (e.g., name, social security number, birth date, telephone number, driver's license number and state, email address) in association with an enrollment process. In step 405, the service provider may create a new subscriber entry in a database. A subscriber entry, as used herein, refers generally to one or more records containing information relating to a subscriber. A user may be associated with multiple subscriber entries, as discussed earlier. The new entry may be initially populated with the information provided by the subscriber during enrollment. In one or more configurations, the new entry may be temporary until the service provider is able to verify the subscriber's identity to a level of satisfaction. As such, in one example, if a subscriber's initial risk score is determined to be too low, service may be denied to the new subscriber until the service provider is able to verify the subscriber's identity with more confidence and thereby increase the identity risk score. If verification is not accomplished (possibly within a certain period of time), the new entry may be deleted from the database.

In step 410, the service provider may determine whether the new subscriber information already exists in the database by comparing the information with existing information already stored in the database. In one example, an individual or other entity may already be a subscriber of the service provided by the service provider through a first service relationship and is now enrolling as a new subscriber through a second service relationship. Accordingly, some or all of the information about the individual or other entity may be duplicative of the existing subscriber entry. If, in step 415, the service provider determines that a match is found, the service provider may copy the universal or temporary identifier associated with the matching entry to the new subscriber entry in step 420. Additionally, the service provider may set the identity risk of the new subscriber to an initial risk score in step 423. In one example, the initial risk score may be copied from the matching entry. Alternatively, the identity risk score may be determined based on various predefined factors. In step 425, the service provider may subsequently determine whether any unresolved negative experiences are associated with the matching entry. In one example, an unresolved negative experience may be generated and/or identified if funds associated with a payment made on behalf of a subscriber remain uncollected. Flags may be set to indicate unresolved negative experiences for appropriate subscribers. If there exists one or more unresolved negative experiences, the new subscriber may be blocked in step 430 from performing any actions until the issues are resolved. In fact, the new subscriber may be instructed in step 435 to contact a customer service center to resolve the issue. If, however, no unresolved negative experiences are found in step 425, the new subscriber may be allowed to use the service.

If no subscriber entries are found to match the new subscriber entry, the enrollment information of the new subscriber may be submitted to an identity service for verification in step 440. The identity service may be a third party identity service or, alternatively or additionally, be an in-house identity service. In either case, in step 445, the service provider may receive a universal or temporary identifier, as discussed earlier, associated with the subscriber in response to its submission. Additionally, a confidence level may also be received as part of the response from the identity service indicating a level of confidence with which the subscriber's identity was verified. In step 450, the service provider may compare the received identifier with the identifiers stored in the database. If a match is found in steps 450 and 455, an identity risk score associated with the subscriber may be determined in step 460. The risk value may be determined based on the service provider's inability to match the subscriber's information and/or the identity service's ability to match identifier information. That is, the service's inability to match the subscriber's information may decrease the identity risk score (i.e., less confident) by a first amount while the ability to match the identifier may modify the identity risk score upward (i.e., more confident) by a second amount. A variety of other identity risk score considerations may also be factored into the calculation of the new subscriber's identity risk score. Once the identity risk score has been determined in step 460, the service may proceed to step 425 to determine whether unresolved negative experiences exist.

If, however, no match of the identifier is found in steps 450 and 455, the new subscriber's identity risk score may be determined and set to a value that reflects such circumstances in step 465. In one instance, the identity risk score may be set to a relatively low value since the service provider is not able to match the subscriber to any previous subscriber's in the service's database. One of ordinary skill in the art will appreciate that an identity risk score may be calculated in a variety of manners and taking into consideration a multitude of factors. For example, the confidence level that is received from the identity service may serve to increase or decrease a subscriber's identity risk score. Once the identity risk score is set, the subscriber may proceed to use the service.

Once a subscriber has enrolled and a new subscriber entry has been created in a service provider's database, the subscriber may proceed to perform a variety of functions, unless blocked as a result of unresolved negative experiences and as allowed by the identity risk score. In one example, a subscriber may wish to add financial account information to his or her account. The financial account information may identify an account from which funds may be obtained for paying for various services, products, bills and the like.

Figure 5:
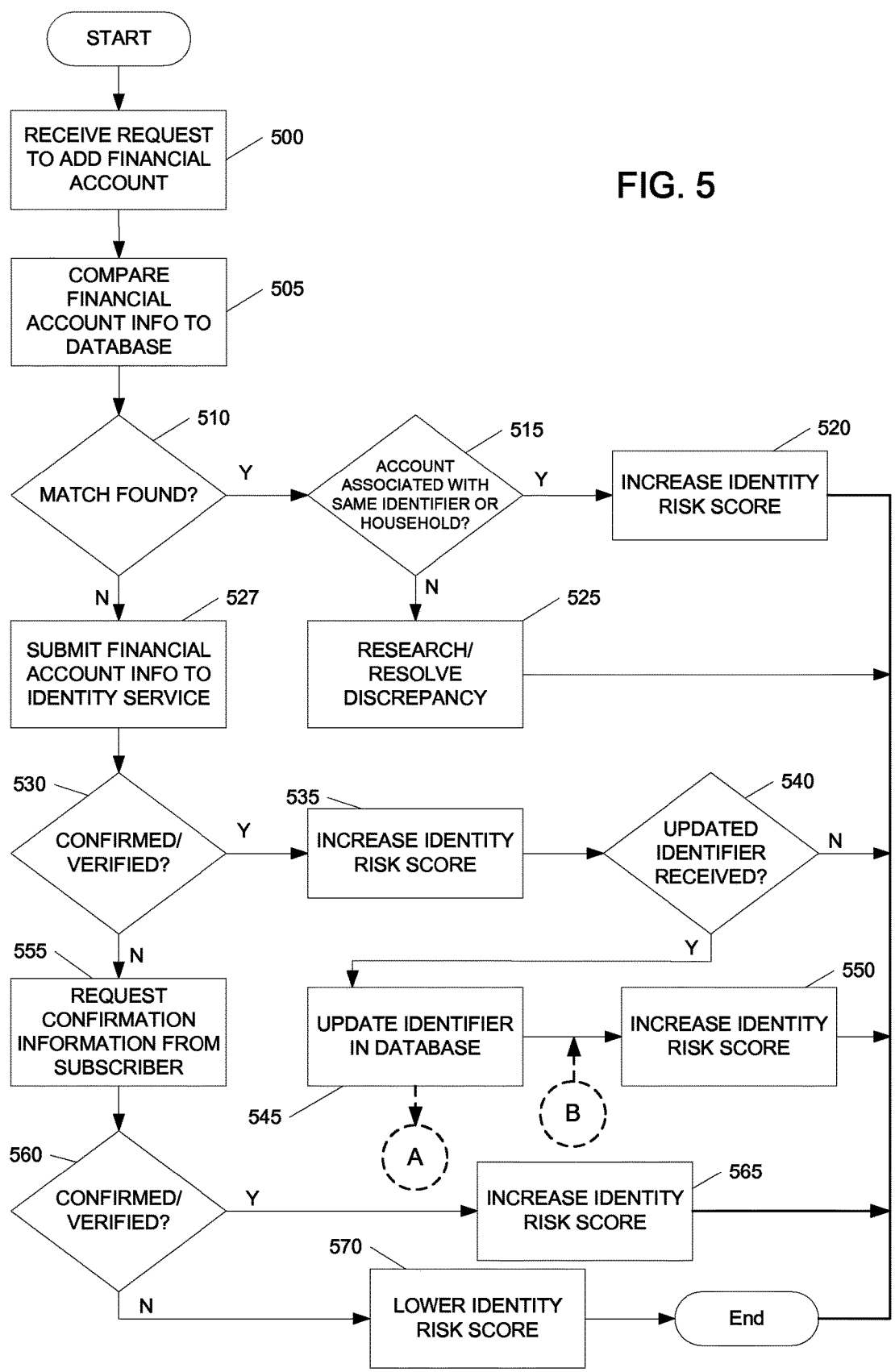
FIG. 5 is a flowchart illustrating a method for modifying an identity risk score based on the addition of a financial account according to one or more aspects described herein.

FIG. 5 is a flowchart illustrating a method for modifying an identity risk score associated with a subscriber adding new financial account information. In step 500, a request may be received from a subscriber to add a financial account to his or her service account. The request may include information such as a type of financial account (e.g., checking, money market, credit), financial institution name, routing transit number, account number, and the like. Using this submitted information, a service provider may determine whether the financial account already exists in the database in step 505. For example, the service provider may compare the financial account information submitted with existing financial accounts that are stored in the database. If a matching financial account is found in step 510, the service provider may further determine whether the account is associated with the same subscriber identifier or with the same group in step 515. Types of groups may include a household group (i.e., a group of individuals having a family relationship), a friend group, a business group, and a social group among others. In short, a group may be defined based on one or more types of relationships between entities. Determining whether two subscribers are associated with the same group may involve requesting a group identifier from an identity service. If the group identifier associated with each subscriber adding the financial account and the subscriber already having the financial account match, the service may determine that the two subscribers belong to the same group. In one example, the service provider may compare address, telephone number, surnames and other information to determine whether the two subscribers are related to the same household group. A variety of other processes may be used in addition to or in place of the above described methods for determining whether two subscribers are associated with the same group.

If, in step 515, the service provider determines that the subscribers have the same identifier and/or are related to the same group, the service provider may increase the first subscriber's identity risk score by a specified amount in step 520. The increase may reflect an increased certainty of the first subscriber's identity derived based on known relationships between subscribers and financial account information. If, however, the service provider determines that there is no match in identifier or group, the request for adding a financial account may be submitted for research and resolution in step 525. In one example, the request may be submitted for manual resolution. Manual resolution may include submitting the request to service provider personnel who may manually research correspondences between the financial account and the subscriber. Alternatively, research and resolution of the discrepancy may be handled by one or more automated systems. For example, a research and resolution system may transmit an automated e-mail message to the financial institution holding the financial account to request verification.

If a financial account match is not found in step 510, the service provider may submit the financial account information to an identity service for verification that the account is associated with the requesting subscriber in step 527. The request may include the subscriber's universal or temporary identifier along with the financial account information. If the identity service is able to confirm the association in step 530, the subscriber's identity risk score may be increased in step 535. In step 540, the service provider may further determine whether an updated identifier has been received from the identity service. An identifier may be updated if the identifier is temporary and the identity service is able to match a universal identifier to the subscriber based on new information. For example, in the above instance, the financial account information may be used to confirm a subscriber's identity and association with a universal identifier. Accordingly, a temporary identifier that was previously issued may be replaced or updated by the universal identifier. As discussed, a temporary identifier may be assigned if an identifier associated with a subscriber's information could not be found by the identity service. If an updated identifier is received, the subscriber's identifier may be replaced with the updated identifier in step 545.

Figure 8:
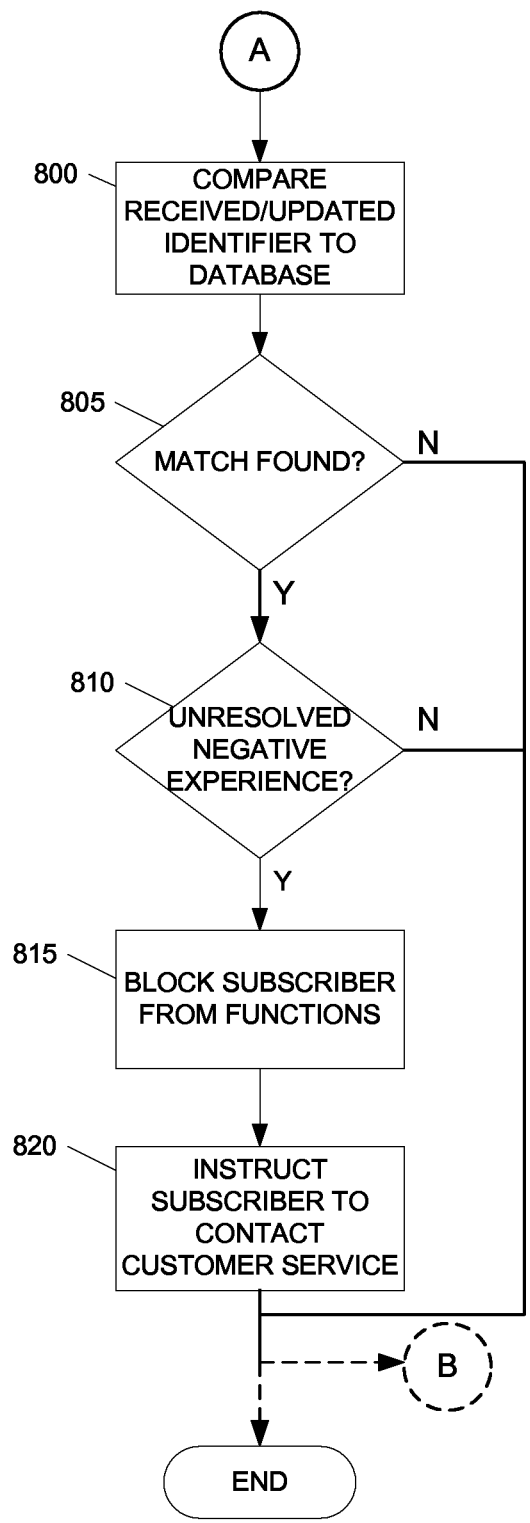
FIG. 8 is a flowchart illustrating a method for identifying and managing unresolved negative experiences according to one or more aspects described herein.

According to one or more aspects, once the subscriber identifier is updated in step 545, the service provider may optionally determine whether the updated identifier is associated with any unresolved negative experiences. FIG. 8 is a flowchart illustrating a method for determining whether unresolved negative experiences exist. In step 800, a service provider may compare the received updated identifier with the subscriber database to determine whether any other subscriber entries exist with the same identifier. In step 805, the service provider may determine whether any matching entries were found. If not, the process may end there or proceed to another step in the underlying process (e.g., step 550 of FIG. 5). If, however, the service provider finds one or more matches to the updated identifier, the service provider may determine whether those subscriber entries associated with the matching identifier are associated with unresolved negative experiences in step 810. If no unresolved negative experiences are found, the process may end or proceed to another step in the underlying process (e.g., step 550 of FIG. 5).

If, on the other hand, unresolved negative experiences are found, the service provider may request that the subscriber contact customer service in order to resolve the issue(s) in step 820. In one or more instances, a following step might not be performed until the negative experiences have been resolved. For example, a subscriber's identity risk score might not be increased (e.g., step 550 of FIG. 5) until the unresolved negative experiences are cleared.

Referring again to FIG. 5, once a subscriber's identifier has been updated, the subscriber's identity risk score may be increased in step 550. Further, in step 555, the service provider may request account confirmation from the subscriber if the subscriber's association with the financial account information is not confirmed by the identity service in step 630. The account confirmation process may include various confirmation algorithms including depositing a random amount of money into the financial account and asking the subscriber to verify that amount. Other confirmation algorithms that may be used are disclosed in U.S. patent application Ser. No. 10/284,462, entitled "System and Method for Verifying a Financial Instrument Using a Preferred Single Values" and filed on Oct. 31, 2002 and U.S. Pat. No. 7,177,846, entitled "A Technique For Account Authentication" and issued on Feb. 13, 2007, both of which are hereby incorporated by reference in their entirety. If the account is confirmed by the subscriber (as determined in step 660), the subscriber's identity risk score may be increased in step 665. If, however, the account is not confirmed, the subscriber's identity risk score may be decreased in step 670.

The modification of an identity risk score based on a subscriber's interaction with a service provider provides a more accurate and flexible method of determining the certainty associated with a subscriber's identity.

Figure 6:
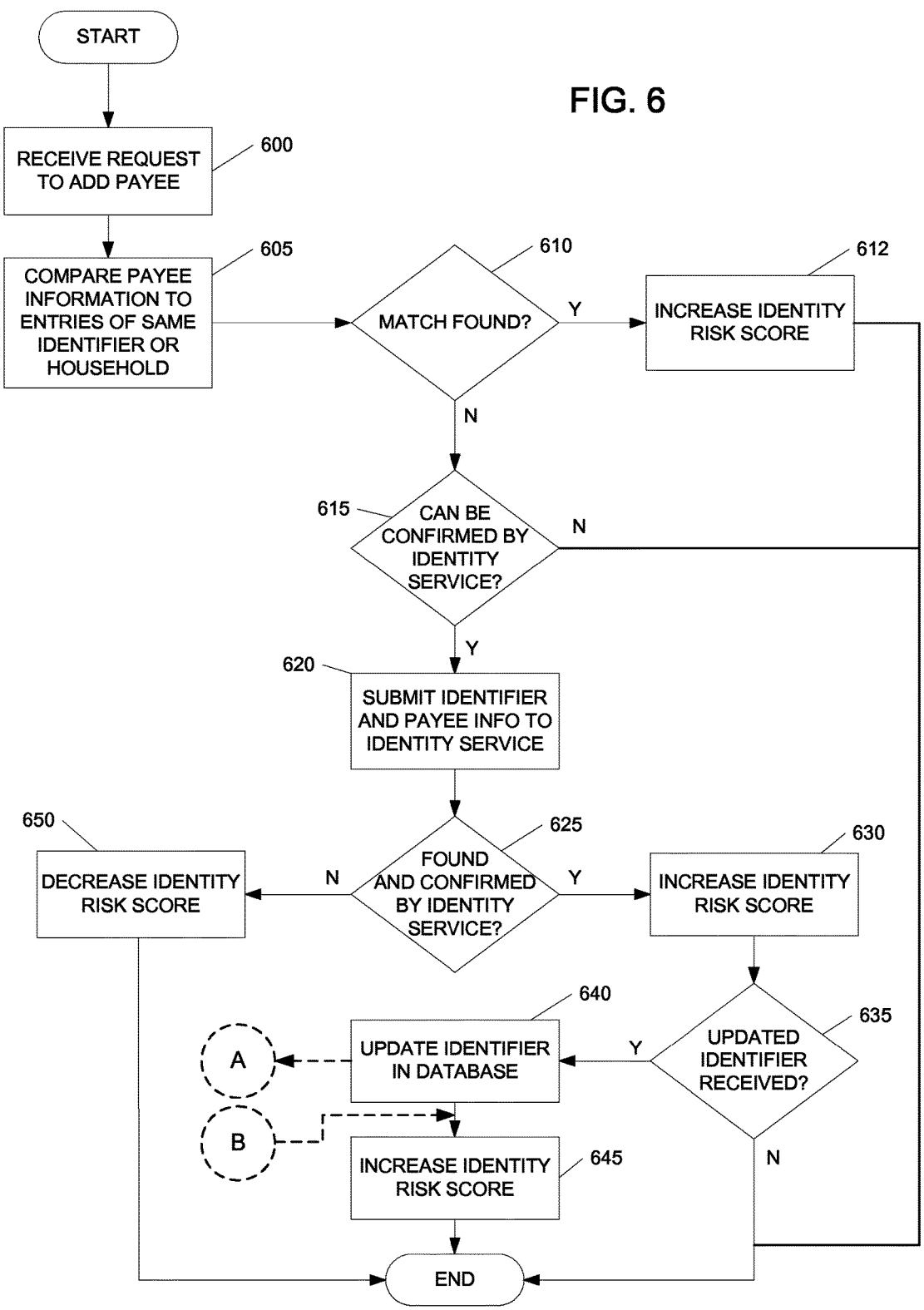
FIG. 6 is a flowchart illustrating a method for modifying an identity risk score based on the addition of a payee according to one or more aspects described herein.

FIG. 6 is a flowchart illustrating a method for adjusting an identity risk score based on a service provider's ability to confirm payee information association with the subscriber. In step 600, a service provider may receive a request from the subscriber to add a payee to his account. A payee may correspond to a biller, a merchant, another individual or the like, typically providing goods or a service to the subscriber. In step 605, the service provider may compare the payee information to existing payee information associated with the same identifier and/or group. If a match is found in step 610, the identity risk score associated with the subscriber may be increased in step 612. If however, a match is not found, the service provider may determine whether an association between the payee and the subscriber can be confirmed by an identity service in step 615. For example, in some instances, payees might only be confirmed by an identity service if the payees are major creditors. The determination of step 615 may be performed by comparing the payee information to a list of verifiable payees or category of payees. If the payee information cannot be verified using an identity service or known information (i.e., information stored in the service provider's database), the process may terminate without increasing or decreasing the subscriber's identity risk score.

If, however, the payee information can be verified with an identity service in step 615, a request for confirmation may be sent to the identity service in step 620. The request may include the subscriber's universal or temporary identifier as well as the payee information. In step 625, the service provider may determine whether the identity service was able to confirm an association between the payee and the subscriber. If so, the subscriber's identity risk score may be increased in step 630. In addition, the service provider may determine whether an updated identifier has been identified by and received from the identity service in step 635. Again, an updated identifier may be received if the subscriber's identity was previously indeterminable or unconfirmed. In such instances, a temporary identifier may be issued by an identity service. Additionally or alternatively, an updated identifier may also be received if a subscriber was mistakenly identified by a first identifier. Upon determining a correct second identifier, the identity service may provide an update to the service provider with the second identifier. If an updated identifier is received, the service provider may update the database with the new identifier information in step 640. Furthermore, the service provider may increase the identity risk score associated with the subscriber in step 645.

Additionally, in one or more configurations, the service provider may further determine whether the updated identifier is associated with unresolved negative experiences. As discussed above, FIG. 8 is a flowchart illustrating a method for identifying and managing unresolved negative experiences. Accordingly, such a method may be used once an updated is received and the database has been updated, e.g., as shown in step 640 of FIG. 6.

Referring again to FIG. 6, if an association between the payee and the subscriber cannot be confirmed by the identity service in step 625, the identity risk score associated with the subscriber may be decreased or reduced in step 650. The amount by which an identity risk score is increased or decreased may be determined in a variety of manners including predefined algorithms and/or manual evaluations that are known in the art.

As discussed above, in many instances, an identifier associated with a subscriber may be subsequently updated or replaced by a new identifier. In one example, a temporary identifier issued for a subscriber may be replaced by a universal identifier upon verification of the subscriber's identity. The updating of a subscriber's identifier may involve other processes including updating the identity risk score associated with the subscriber and determining whether unresolved negative experiences exist.

Figure 7:
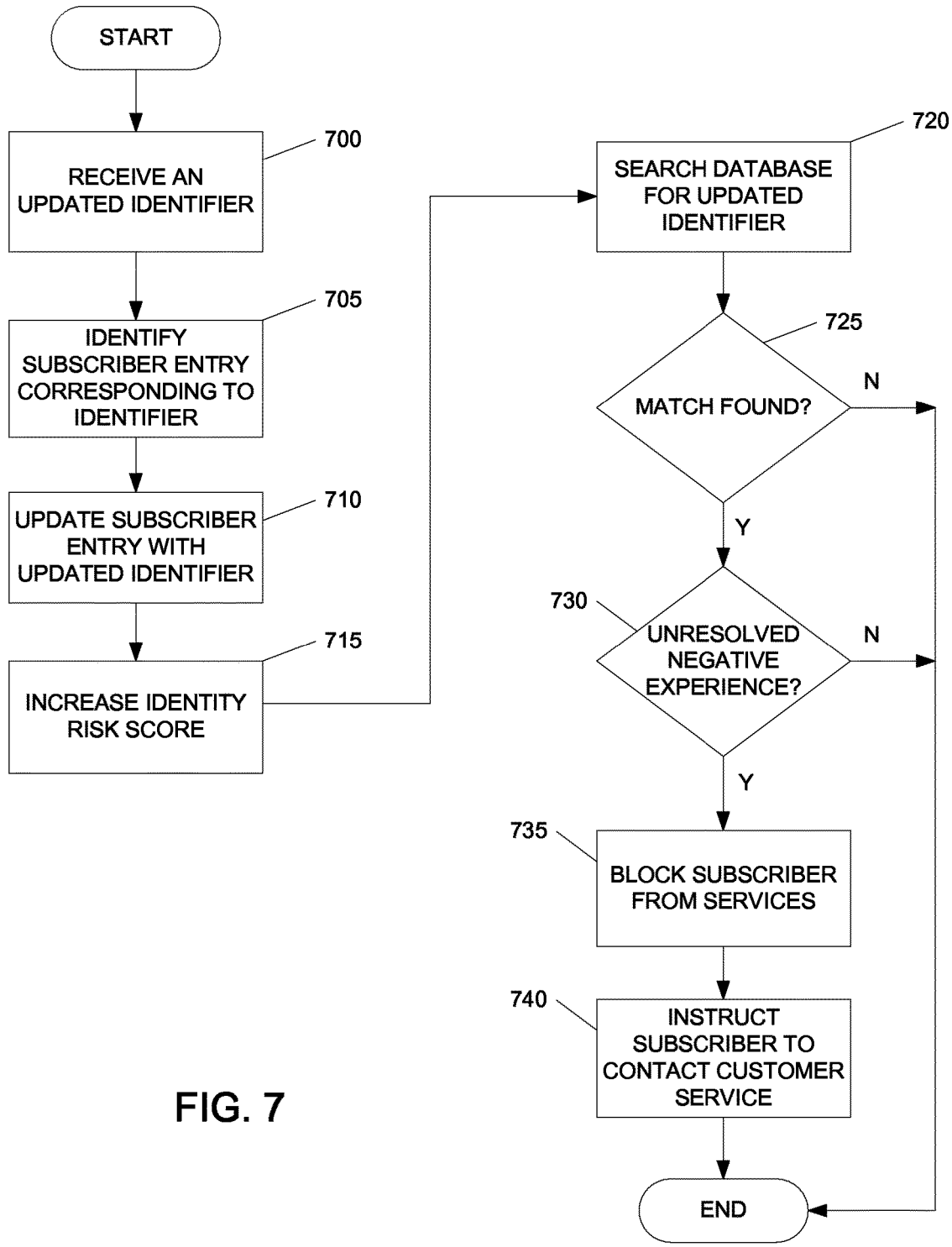
FIG. 7 is a flowchart illustrating a method for updating a subscriber identifier and modifying an identity risk score based on the updated identifier according to one or more aspects described herein.

FIG. 7 is a flowchart illustrating a method for updating an identifier associated with a subscriber and modifying an identity risk score of the subscriber based on the updated identifier. In step 700, a service provider may receive an updated identifier. The updated identifier may be received from an identity service and may further include identification of the old identifier (e.g., a temporary identifier) the new updated identifier (e.g., a universal identifier) is to replace. In step 705, the financial service may identify the corresponding subscriber entry in the database using the old identifier. Once identified, the subscriber entry may be updated with the new identifier in step 710. In step 715, the identity risk score associated with the subscriber may be increased. In one or more arrangements, if the new identifier corresponds to a confirmed universal identifier, the identity risk score of a subscriber may be increased in light of the higher level of confidence or certainty associated with a universal identifier (as compared to a temporary identifier).

In step 720, the service provider may further search for one or more subscriber entries that match the updated identifier. If a match is found in step 725, the service provider may determine whether the matched subscriber entry includes any unresolved negative experiences in step 730. If unresolved negative experiences are indicated, the subscriber whose identifier was updated may be blocked from using the functions and services provided by the service provider in step 735 and asked to contact customer service to resolve the negative experiences in step 740. Unresolved negative experiences may include inability to collect funds associated with a payment performed on behalf of the subscriber, non-payment of a bill, poor credit, legal actions taken against the subscriber and the like. If, on the other hand, either no identifier match was found (step 725) or no unresolved negative experiences were identified (step 730), the process may end and the subscriber may be allowed access to the service provider's functions.

Identity risk scores may be restricted to values between an upper and a lower threshold. As such, identity risk scores might not be able to be increased above a certain ceiling and/or decreased below a certain floor. Additionally, trends in identity risk score modifications may be factored into any determination of future increases or decreases of the score and/or any interpretations of the identity risk score. For example, if a subscriber has had a trend of three (3) consecutive increases in identity risk score, a high level of certainty may attributed to the identity risk score even if the identity risk score is still relatively low. In another example, if a subscriber has a relatively high identity risk score but has received downward adjustments the two (2) previous instances, there may be concern that the subscriber's identity has been stolen or that the identity risk score should be interpreted with more caution.

While the discussion thus far has generally been directed toward modification of an identity risk score based on various types of transactions, an identity risk score may also have impacts on types of transactions and functions available to a subscriber. In one or more configurations, having a identity risk score higher or lower than a certain threshold may affect the types and scope of functionality available.

For example, subscribers having a low identity risk score (i.e., lower than the threshold) may be restricted to the types of payees that they may add (e.g., to just reversible merchants), limited to the number of payments that can be submitted in a certain period of time, limited to a maximum amount of payment and/or restrictions in other functional aspects (e.g., ability to modify/view profile information, bill information, payee information, payment history).

Figure 9:
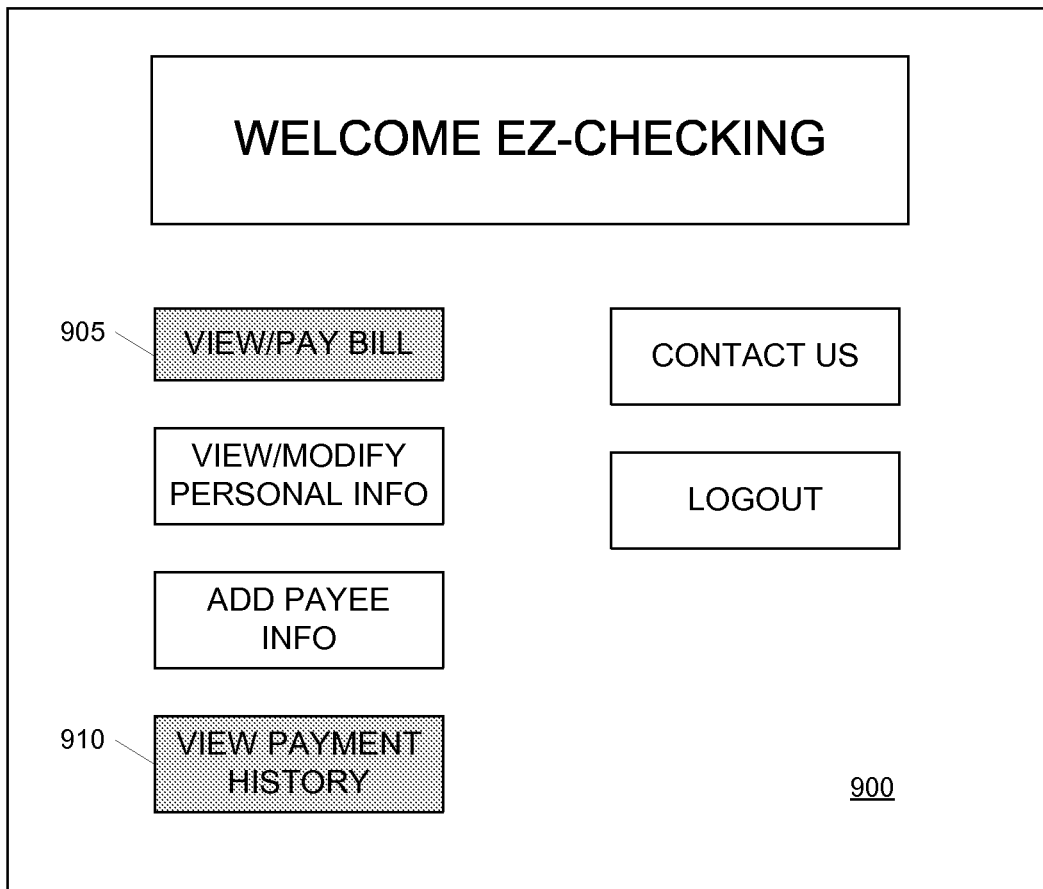
FIG. 9 illustrates a user interface having multiple functions deactivated according to one or more aspects described herein.

According to one or more aspects, upon processing a subscriber's login information and determining that the subscriber's identity score is below the predefined threshold, the restricted functionalities may be grayed out or otherwise made unavailable. FIG. 9 illustrates a user interface showing a welcome screen 900 for a service provider with functionality restricted from subscriber use. For example, view bill option 905 is grayed out, indicating an unavailability of that function. Similarly, a view payment history option 910 is also grayed out to indicate to the subscriber that this function is not available to him or her (HDD→You might not want to show the latter grayed out, as then the subscriber is caught in a Catch-22. One way to improve the score is to submit a financial account that's recognized—but that's done through modifying personal info!).

In another example, a subscriber may be restricted from viewing a bill, viewing or modifying his or her profile, viewing or modifying payee information and/or viewing payment history if his or her identity risk score is not sufficiently high. Similarly, payment requests may be denied if the subscriber's identity risk does not meet the threshold. Alternatively or additionally, a subscriber's payment request may always be accepted by a service provider regardless of the subscriber's identity risk score. However, in accepting the payment request, the request may be flagged according to the subscriber's identity risk score. As such, when the payment request is submitted for processing, the payment request might not be processed if the subscriber's identity risk score is too low.

Figure 10:
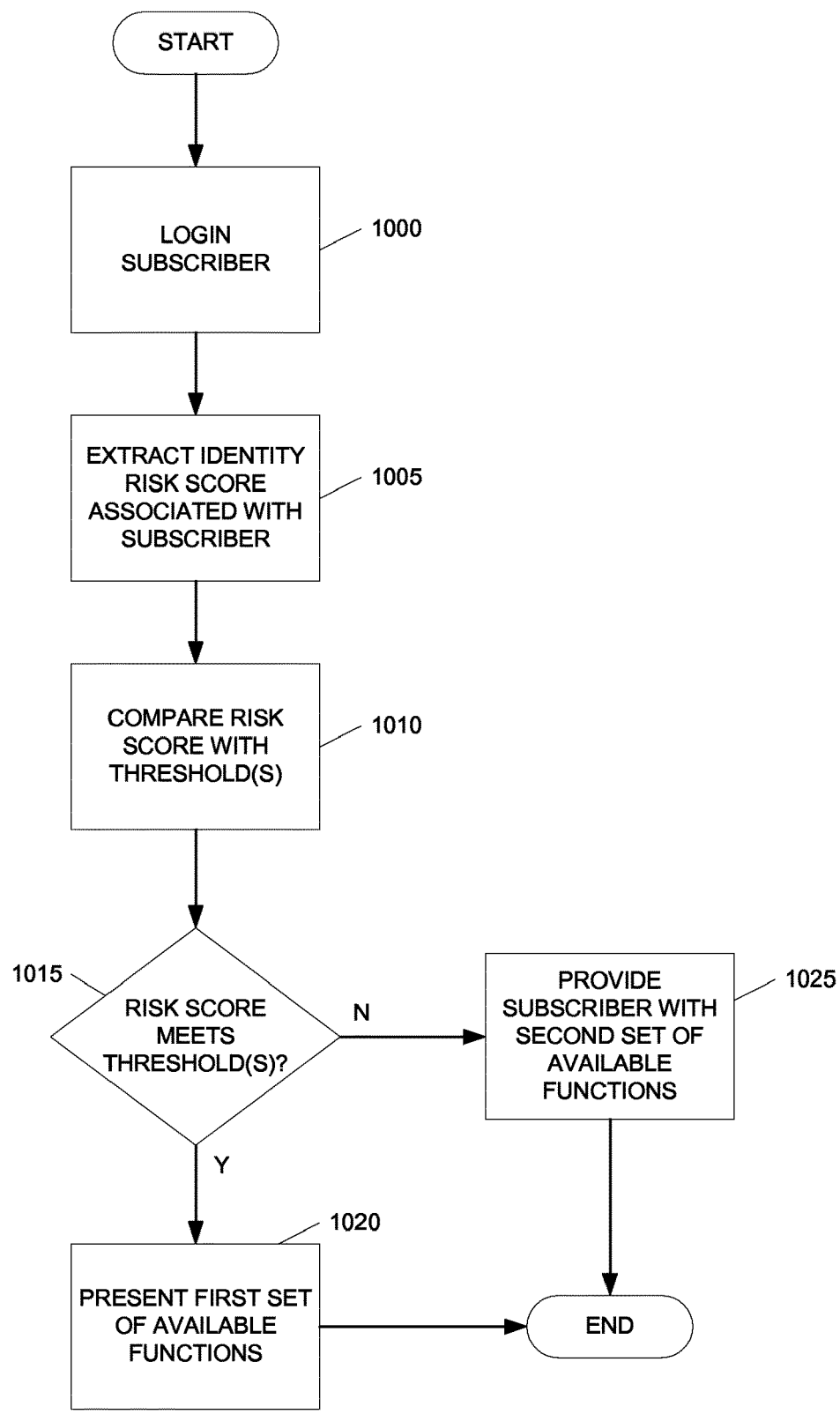
FIG. 10 is a flowchart illustrating a method for determining a set of functions to provide a subscriber based on the subscriber's identity risk score according to one or more aspects described herein.

FIG. 10 is a flowchart illustrating a method for identifying functionality available to a subscriber based on the subscriber's identity risk score. In step 1000, a subscriber may login to a service provider. In step 1005, the service provider may extract an identity risk score associated with the subscriber from the service provider's database. In step 1010, the identity risk score may be compared to one or more predefined identity risk score thresholds to determine whether the subscriber's identity risk score exceeds the one or more thresholds. If the subscriber's identity risk score exceeds or meets the one or more thresholds (as determined in step 1015), the service provider may present a first set of available functions to the subscriber in step 1020. In contrast, if the subscriber's identity risk score does not exceed the one or more thresholds, the service provider may provide the subscriber with a second or restricted set of available functions in step 1025. In one or more arrangements, the second or restricted set of available functions may be a subset of less than all of the functions included in the first set of available functions. Further, according to one or more aspects, a risk value determined based on the identity risk score and one of a credit risk score and a fraud risk score may be used in place of or in addition to the subscriber's identity risk score. For example, a risk value may be a combination of a subscriber's identity risk score and his credit risk score, where the identity risk score is weighed twice as much as the credit risk score.

Figure 11:
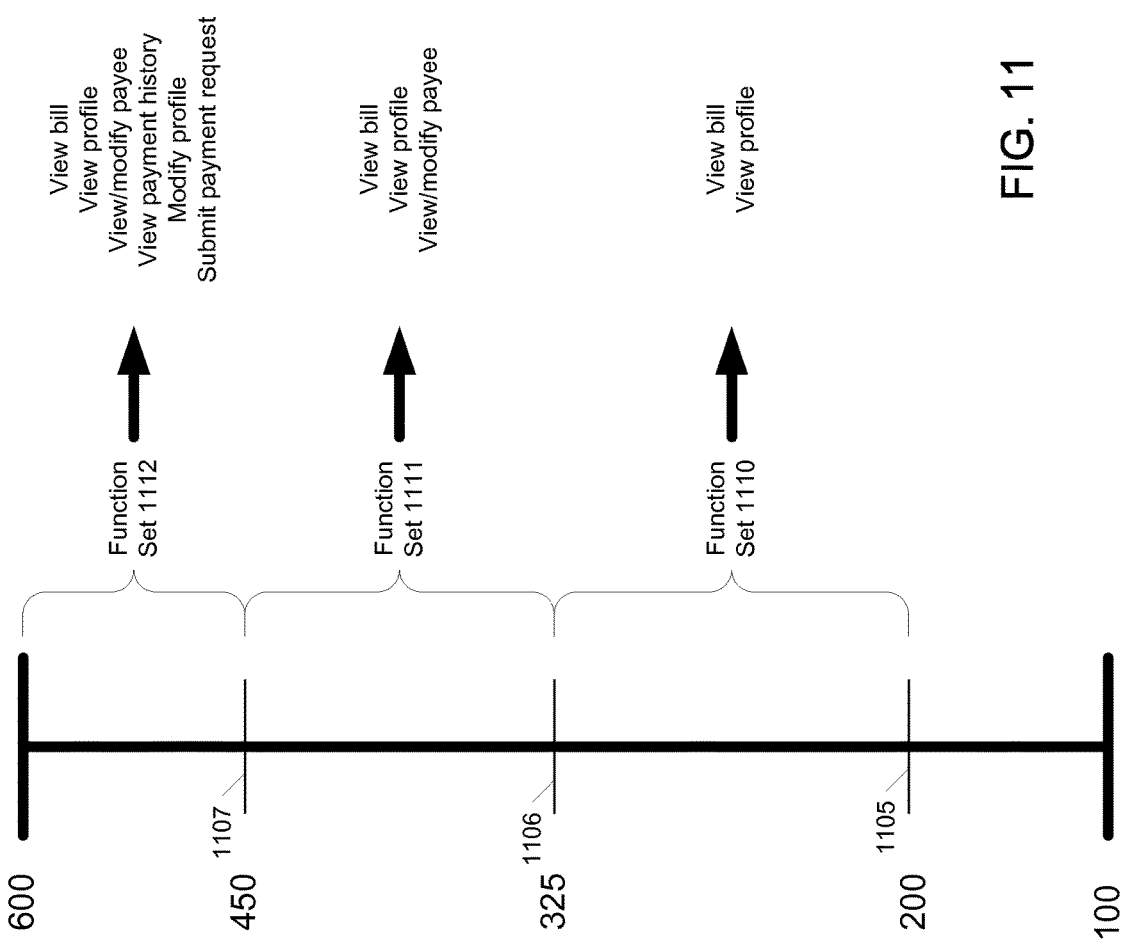
FIG. 11 illustrates an identity risk score scale having multiple thresholds and associated function sets according to one or more aspects described herein.

In one or more arrangements, multiple thresholds may be defined for accessing functions provided by a service provider. That is rather than using a single threshold to define two sets of functionality, multiple thresholds may be used to define more than two sets of functionality available based on identity risk score. Accordingly, as a subscriber's identity risk score increases, additional functions may be added to a set of available functions provided the identity risk score meets new thresholds. FIG. 11 illustrates an identity risk score scale 1100 showing multiple score thresholds 1105, 1106 and 1107. Each range between thresholds corresponds to a set of functions, e.g., sets 1110, 1111 and 1112. For example, function set 1110 includes only view bill and view profile functions. In contrast, function set 1111 includes view bill, view profile and view/modify payee functions while set 1112 includes all of the aforementioned functions as well as view payment history, submit payment request and modify profile functions. One of ordinary skill in the art will appreciate that any number of thresholds and a variety of function sets may be defined.

Figure 12:
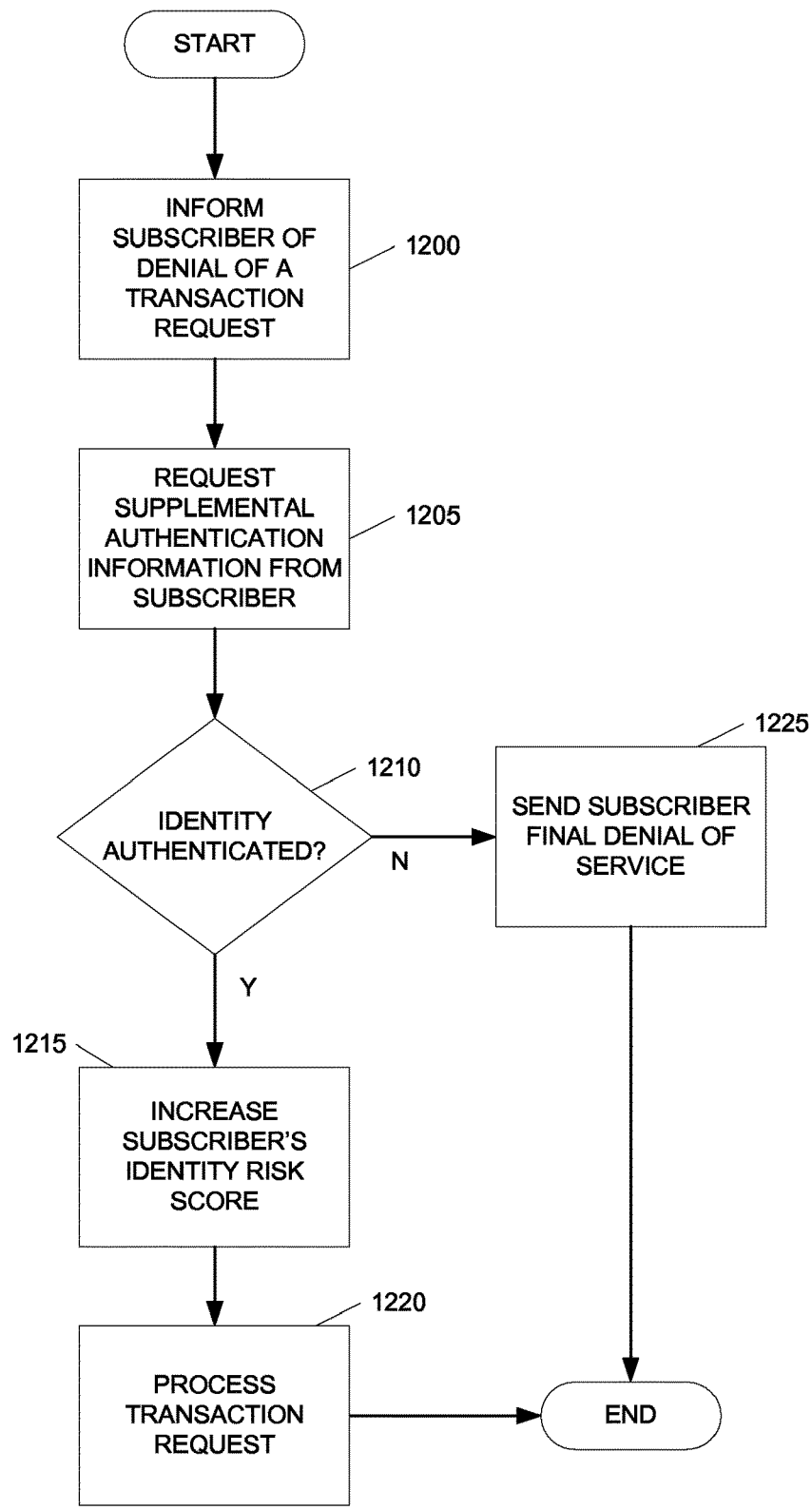
FIG. 12 is a flowchart illustrating a method for obtaining supplemental authentication information from a subscriber according to one or more aspects described herein.

FIG. 12 is a flowchart illustrating a method for obtaining supplemental authentication information if one or more transactions are rejected by a financial commerce service. In step 1200, a subscriber may be informed that a requested transaction has been denied. For example, processing of a subscriber's payment request may be denied if the subscriber's identity risk score is too low. In such a case, the service may prompt the subscriber with a denial message. In step 1205, the service provider may provide an opportunity for the subscriber to provide further authentication information relating to his or her identity. The service provider may, in one or more arrangements, prompt the user for additional authentication information such as mother's maiden name or previous address. Alternatively or additionally, the user or another entity, such as the user's sponsor may be allowed to select the manner in which he or she provides supplemental authentication information. Various manners of providing supplemental authentication information may include a one-time password or token, an out-of-wallet question and/or customer care intervention via e-mail or phone. In step 1210, the service provider may determine whether the user has satisfactorily authenticated his identity based on the supplemental information. If the subscriber has authenticated his identity, the subscriber's identity risk score may be raised in step 1215 and provided access to the previously denied functionality in step 1220 (e.g., the payment request may be released for processing).

If the subscriber fails to provide satisfactory authentication in step 1205, the service provider may present the subscriber with a final denial of service in step 1225. Alternatively, a service may provide a subscriber with multiple opportunities (e.g., 3) before providing a final denial of service.

Further, in one or more configurations, a subscriber's identity risk score may be raised or lowered based on a login profile and/or other login validation information. A login profile or login validation information may include personal information (e.g., security questions), patterns of behavior (e.g., when a subscriber typically logs in or performs various activities), biometric data (e.g., fingerprints or voiceprints) and the like. Thus, if a subscriber is able to login successfully by validating one or more pieces of information stored in the login profile, the subscriber's identity risk score may be increased (or decreased depending on the score interpretation). In one or more examples, login validation may further be performed using a key fob or Radio Frequency ID (RFID) device. That is, if a subscriber is able to validate his or her login using a valid key fob or RFID device, the subscriber's identity risk score may increased or decreased accordingly.

The methods and features recited herein may further be implemented through any number of computer readable media that are able to store computer readable instructions. Examples of computer readable media that may be used include RAM (e.g., RAM 134 of FIG. 1), ROM (e.g., ROM 136 of FIG. 1), EEPROM, flash memory or other memory technology, CD-ROM, DVD or other optical disk storage, magnetic cassettes, magnetic tape, magnetic storage and the like. For example, the methods and features may be implemented as software stored in a CD-ROM or DVD. Upon installation on a device such as computing device 105 of FIG. 1, instructions may be loaded into RAM and executed by a processor (e.g., processor 130 of FIG. 1)

Further, the methods and features recited herein may be implemented using a variety of devices and/or system. Referring to FIG. 1, a processor such as processor 130 may be used to execute the instructions stored in the computer readable media. Data that needs to be stored, e.g., subscriber entries, may be stored in a local database such as storage 132 and/or on a remote device such as storage database 115. The execution of various instructions may also span different devices in a networked environment (e.g., networked system 100). In one example, device 105 may be responsible for managing the database of subscription entries while computing device 110 is configured to initialize, update and/or otherwise modify subscriber identity risk scores.

Aspects described herein have been discussed in terms of exemplary embodiments thereof. Numerous other embodiments, modifications and variations within the scope and spirit of the appended claims will occur to persons of ordinary skill in the art from a review of this disclosure.

We claim:

1. A system for determining whether to enable (i) a full set of electronic functionality via an interactive user interface or (ii) one or more restricted subsets of the full set of electronic functionality via the interactive user interface, the system comprising:
   at least one processor;
   at least one network interface; and
   at least one memory storing computer-executable instructions,
   wherein the at least one processor is configured to access the at least one memory and execute the computer-executable instructions to:
      establish an initial identity risk score for a subscriber relationship of a user for a particular service, wherein the initial identity risk score corresponds to a verification level of an identity of the user;
      receive, via a first network interface of the at least one network interface, a transaction associated with the subscriber relationship, wherein the transaction includes information that (i) has not been previously received in association with the subscriber relationship, and (ii) identifies at least one of a particular account or a particular entity;
      determine whether an association between the particular account or the particular entity and the user or a group to which the user belongs is confirmed;
      automatically modify, based at least in part on determining that whether the association is confirmed, the initial identity risk score to generate a modified identity risk score;
      determine whether to enable (i) a full set of electronic functionality via the interactive user interface or (ii) one or more restricted subsets of the full set of electronic functionality via the interactive user interface by comparing the modified identity risk score or a value derived from the modified identity risk score to a configurable threshold; and
      enable the full set of electronic functionality via the interactive user interface or the one or more restricted subsets of the full set of electronic functionality via the interactive user interface based at least in part on the comparison of the modified identity risk score or the value derived from the modified identity risk score to the configurable threshold.

2. The system of claim 1, wherein the set of functionality includes at least one of: (i) enrollment processing, (ii) login processing, (iii) processing a request to view a bill, (iv) payment request processing, (v) payment processing, (vi) processing a request to view or modify subscriber profile information, (vii) processing a request to view or modify entity information, (viii) processing a request to view payment history, or (ix) collections processing.

3. The system of claim 1, wherein the value is further derived from at least one of: (i) a fraud risk score or (ii) a credit risk score.

4. The system of claim 1, wherein the subscriber relationship is a first subscriber relationship and wherein the at least one processor is configured to establish the initial identity risk score for the subscriber relationship by executing the computer-executable instructions to match the user to a second subscriber relationship with the particular service.

5. The system of claim 4, wherein the at least one processor is further configured to execute the computer-executable instructions to:
   determine that the second subscriber relationship is associated with an unresolved negative experience; and
   deny at least one service function of the particular service to the user via the first subscriber relationship.

6. The system of claim 1, wherein the at least one processor is configured to establish the initial identity risk score by executing the computer-executable instructions to:
   receive, via a second network interface of the at least one network interface, from a third party identity service, an identifier associated with the user or generate the identifier associated with the user.

7. The system of claim 1, wherein the information is first information, and wherein the at least one processor is configured to establish the initial identity risk score by executing the computer-executable instructions to:
   transmit, to a third party identity service via a second network interface of the at least one network interface, second information associated with the user; and
   receive, from the third party identity service via the second network interface of the at least one network interface, a confidence level, wherein the confidence level corresponds to the verification level.

8. The system of claim 1, wherein the at least one processor is configured to establish the initial identity risk score by executing the computer-executable instructions to:
   receive, from a third party service provider via a second network interface of the least one network interface, an identifier associated with the user;
   store the identifier in association with the subscriber relationship in a database; and
   remove at least one item of sensitive information associated with the user from the database.

9. The system of claim 1, wherein the subscriber relationship is a first subscriber relationship and the transaction information includes an account identifier of the particular account, and wherein the at least one processor is configured to determine whether the association is confirmed by executing the computer-executable instructions to determine that a second subscriber relationship of the particular service is associated with the particular account.

10. The system of claim 9, wherein the at least one processor is configured to determine that the second subscriber relationship is associated with the particular account based at least in part on at least one of: (i) an identifier of an entity associated with the particular account or (ii) a group identifier identifying a group that includes the first subscriber relationship and the second subscriber relationship.

11. The system of claim 1, wherein the transaction information includes an account identifier of the particular account, and wherein the at least one processor is configured to determine whether the association is confirmed by executing the computer-executable instructions to:
   transmit, to a third-party identity service via a second network interface of the at least one network interface, the account identifier and other information associated with the user; and
   receive, from the third party identity service via the second network interface of the at least one network interface, a response indicating that an association between the user and the particular account corresponding to the account identifier exists,
   wherein the at least one processor is configured to alter the initial identity risk score by executing the computer-executable instructions to increase the initial identity risk score to reflect an increased confidence in the subscriber relationship.

12. The system of claim 1, wherein the transaction information includes an account identifier of the particular account, and wherein the at least one processor is configured to determine whether the association is confirmed by executing the computer-executable instructions to:
   transmit, to a third-party identity service via a second network interface of the at least one network interface, the account identifier and other information associated with the user; and
   receive, from the third party identity service via the second network interface of the at least one network interface, a response indicating that an association between the user and the particular account corresponding to the account identifier does not exist,
   wherein the at least one processor is configured to alter the initial identity risk score by executing the computer-executable instructions to decrease the initial identity risk score to reflect a decreased confidence in the subscriber relationship.

13. The system of claim 1, wherein the transaction information includes new or revised entity information.

14. The system of claim 1, wherein the subscriber relationship is a first subscriber relationship, and wherein the at least one processor is configured to process the transaction information by executing the computer-executable instructions to:
   determine whether a second subscriber relationship of the particular service is associated with the transaction information based at least in part on at least one of: (i) an identifier identifying an entity corresponding to the first subscriber relationship and (ii) a group identifier identifying a group that includes the first subscriber relationship and the second subscriber relationship;
   transmit, to a third party identity service via a second network interface of the at least one network interface, the transaction information and other information associated with the first subscriber relationship; and
   receive, from the third party identity service via the second network interface of the at least one network interface, a response indicating that an association between the first subscriber relationship and the transaction information exists, wherein the at least one processor is configured to alter the initial identity risk score by executing the computer-executable instructions to increase the initial identity risk score to reflect an increased confidence in the subscriber relationship.

15. The system of claim 1, wherein the at least one processor is further configured
   to execute the computer-executable instructions to:
      receive, from a third-party identity service via a second network interface of the at least one network interface, a first identifier;
      store the first identifier in association with the subscriber relationship;
      receive, from the third party identity service via the second network interface of the at least one network interface, a second identifier;
      identify the user using the first identifier; and
      store the second identifier in association with the subscriber relationship.

16. The system of claim 15, wherein receipt and storage of the first identifier are associated with establishing the initial identity risk score and identification of the user using the first identifier and storage of the second identifier are associated with altering the initial identity risk score.

17. The system of claim 1, wherein the modified identity risk score is below a predefined maximum identity risk score.

18. A method comprising:
   establishing, by a computerized system comprising one or more computers, an initial identity risk score for a subscriber relationship of a user for a particular service, wherein the initial identity risk score corresponds to a verification level of an identity of the user;
   receiving, by the computerized system via a first communication network, a transaction associated with the subscriber relationship, wherein the transaction includes information that (i) has not been previously received in association with the subscriber relationship, and (ii) identifies at least one of a particular account or a particular entity;
   determining, by the computerized system, whether an association between the particular account or the particular entity and the user or a group to which the user belongs is confirmed;
   automatically modifying, based at least in part on determining whether the association is confirmed and by the computerized system, the initial identity risk score to generate a modified identity risk score;
   determining whether to enable (i) a full set of functionality via an interactive user interface or (ii) one or more restricted subsets of the full set of electronic functionality via the interactive user interface by comparing the modified identity risk score or a value derived from the modified identity risk score to a configurable threshold; and
   enabling, by the computerized system, the full set of electronic functionality via the interactive user interface or the one or more restricted subsets of the full set of electronic functionality via the interactive user interface based at least in part on the comparison of the modified identity risk score or the value derived from the modified identity risk score to the configurable threshold.

19. The method of claim 18, wherein the transaction information includes an account identifier of the particular account, and wherein determining whether the association is confirmed comprises:
   transmitting, to a third-party identity service via a second communication network, the account identifier and other information associated with the user; and
   receiving, from the third party identity service via the second communication network, a response indicating that the association between the user and the particular account corresponding to the account identifier exists, wherein altering the initial identity risk score comprises increasing the initial identity risk score to generate the altered initial identity risk score, wherein the modified identity risk score reflects an increased confidence in the subscriber relationship.

20. The method of claim 18, wherein the transaction information includes an account identifier of the particular account, and wherein determining whether the association is confirmed comprises:
   transmitting, to a third-party identity service via a second communication network, the account identifier and other information associated with the user; and
   receiving, from the third party identity service via the second communication network, a response indicating that the association between the user and the particular account corresponding to the account identifier does not exist, wherein altering the initial identity risk score comprises decreasing the initial identity risk score to generate the modified identity risk score, wherein the modified identity risk score reflects a decreased confidence in the subscriber relationship.

* * * * *